UNITED STATES PATENT OFFICE.

JOSEPH E. ZILK, OF SHARPSBURG, PENNSYLVANIA.

PROCESS OF MAKING FERTILIZERS.

1,236,812.

No Drawing.

Specification of Letters Patent. Patented Aug. 14, 1917.

Application filed November 11, 1916. Serial No. 130,835.

*To all whom it may concern:*

Be it known that I, JOSEPH E. ZILK, a citizen of the United States, residing at Sharpsburg, in the county of Allegheny and State of Pennsylvania, have invented new and useful Improvements in Processes of Making Fertilizers, of which the following is a specification.

The present invention relates to the production of phosphatic fertilizers from phosphate rock, by an improvement in that class of processes in which the phosphate rock is heated with other materials.

The process of the present invention comprises heating phosphate rock with limestone in the presence of coke and a suitable flux, the entire material being heated preferably being introduced into the upper end of a rotary kiln, and being heated therein until a particular physical condition is produced in the mass, by virtue of which the product is readily ground or pulverized, and in which a considerable proportion of the phosphoric acid is in a condition in which it is available as plant food.

In carrying out my process I preferably proceed according to one or the other of the following examples.

Example 1: I take 2000 pounds of crude phosphate rock containing say about 30% of phosphoric acid ($P_2O_5$) and pulverize the same so that about 80% will pass through a screen having 100 meshes per square inch. To this material I add from 200 to 300 pounds (preferably about 300 pounds) of pulverized coke, and 200 pounds (or more, say even up to 300 pounds) of pulverized limestone and a suitable quantity of a flux, for example 300 pounds of marl.

The material is then thoroughly mixed, and preferably moistened with water sufficiently to form a paste. This is then introduced into a kiln which may be an ordinary rotary cement kiln and heated therein to a temperature of from 1300 to 1400° F. The material should be maintained in the kiln at this high temperature for a considerable time, say 75 to 90 minutes. Care should be taken however, not to very much exceed this temperature, since at the higher temperatures, a hard clinker would be produced, which would be difficult to grind, and which would also not contain as high a percentage of available phosphoric acid as that produced by the preferred temperature above stated. The kiln may be heated with any kind of suitable fuel, for example coal dust, gas or fuel oil. The heating is effected in the manner commonly employed in cement kilns, namely by introducing a blast of fuel and air into the lower end of the kiln.

During the heating operation, and continuing perhaps even after the material has left the zone of highest temperature in the kiln, the coke dust itself burns and thereby aids in the production of a light, porous, readily crushed mass of rounded nodules, in which there is a considerable proportion of the phosphoric acid available. The nodules should leave the furnace in the condition above stated, and care should be exercised not to overheat the mass, which would produce hard, completely clinkered nodules.

Example 2: I may heat in the manner above described, a mixture of 2,000 pounds of crude phosphate rock, 200 to 300 pounds (preferably near 300 pounds) of limestone, 200 to 300 pounds (preferably about 200 pounds) of ground coke and about 400 pounds of niter cake. This mixture will be prepared and introduced into the furnace in a completely mixed, wet state, and is treated in the manner above described.

I am aware that various mixtures of phosphate rock and similar material have been heated to high temperatures, temperatures around 2,000 to 2,700° F., having been previously suggested. I have found that the heating for a considerable time, at a temperature too low to produce a hard clinker, but high enough to produce a semi-clinkering of the mass, with the production of soft nodules, and the maintaining of this temperature for a considerable time, enables me to produce products having the valuable qualities above referred to.

What I claim is:

1. The process of making a fertilizer material which comprises producing an intimate mixture of phosphate rock, coke, limestone and a flux, and heating and rolling the mixture, under conditions capable of producing the combustion of said coke only, to a temperature of 1300 to 1400° F.

2. The process of making a fertilizer material which comprises producing an intimate wet mixture of phosphate rock, coke, limestone and marl, all in a finely pulverized state, and heating and tumbling the mixture, under conditions capable of producing the combustion of said coke only, to a temperature of 1300 to 1400° F.

3. The process of producing a fertilizer material which comprises mixing together phosphate rock, coke and limestone, all in a finely pulverized state, producing a complete mixture of such materials with a flux, and with sufficient water to form a pasty mass only, heating such mass to about 1300 to 1400° F., while allowing the coke therein to burn.

4. The process of producing a fertilizer which comprises heating only to incipient clinkering, an intimate mixture of phosphate rock 2,000 parts, coke 200 to 300 parts, limestone 200 to 300 parts, flux 300 to 400 parts, and thereafter grinding the mass.

In testimony whereof I affix my signature.

JOSEPH E. ZILK.